United States Patent
Reihlen et al.

(10) Patent No.: US 9,793,710 B2
(45) Date of Patent: Oct. 17, 2017

(54) ENERGY STORING DEVICE WITH COOLING ELEMENTS, AND METHOD FOR COOLING ENERGY STORING CELLS

(71) Applicants: Robert Bosch GmbH, Stuttgart (DE); Samsung SDI Co., Ltd., Yongin-si, Gyeonggi-do (KR)

(72) Inventors: Eckart Reihlen, Engels (RU); Jens Schneider, Leonberg (DE); Anne Heubner, Stuttgart (DE); Hans-Joerg Wolff, Schorndorf (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 279 days.

(21) Appl. No.: 14/387,943

(22) PCT Filed: Mar. 13, 2013

(86) PCT No.: PCT/EP2013/055125
§ 371 (c)(1),
(2) Date: Sep. 25, 2014

(87) PCT Pub. No.: WO2013/143847
PCT Pub. Date: Oct. 3, 2013

(65) Prior Publication Data
US 2015/0123481 A1    May 7, 2015

(30) Foreign Application Priority Data
Mar. 29, 2012    (DE) .................. 10 2012 205 109

(51) Int. Cl.
*H02J 1/10* (2006.01)
*H01M 10/613* (2014.01)
(Continued)

(52) U.S. Cl.
CPC .............. *H02J 1/10* (2013.01); *B60L 3/0046* (2013.01); *B60L 3/12* (2013.01); *B60L 11/1874* (2013.01);
(Continued)

(58) Field of Classification Search
CPC ........ H02J 1/10; H02J 7/0024; H01M 10/613; H01M 10/625; H01M 10/6572;
(Continued)

(56) References Cited

U.S. PATENT DOCUMENTS

| 5,642,275 A | 6/1997 | Peng et al. |
| 2008/0036425 A1 | 2/2008 | Tashiro et al. |

(Continued)

FOREIGN PATENT DOCUMENTS

| CN | 101057364 A | 10/2007 |
| DE | 10 2008 054 949 A1 | 6/2010 |

(Continued)

OTHER PUBLICATIONS

International Search Report corresponding to PCT Application No. PCT/EP2013/055125, dated Feb. 5, 2014 (German and English language document) (7 pages).

*Primary Examiner* — Hal Kaplan
(74) *Attorney, Agent, or Firm* — Maginot, Moore & Beck LLP

(57) ABSTRACT

The disclosure relates to an energy storing device for generating a supply voltage for an electric machine, comprising at least one energy supply branch which is connected in parallel and each of which has a plurality of first and second energy storing modules that are connected in series. The first and second energy storing modules each comprise an energy storing cell module, which has at least one energy storing cell, and a coupling device, which is designed to selectively connect the energy storing cell module into the respective (Continued)

energy supply branch or to bridge said energy storing cell module. Each second energy storing module additionally has a cooling element for the at least one energy storing cell, and the cooling element is designed to cool the at least one energy storing cell dependent on a control signal of a cooling controller.

8 Claims, 3 Drawing Sheets

(51) Int. Cl.
*H01M 10/625* (2014.01)
*H01M 10/6572* (2014.01)
*B60L 11/18* (2006.01)
*H02J 7/00* (2006.01)
*B60L 3/00* (2006.01)
*B60L 3/12* (2006.01)

(52) U.S. Cl.
CPC ....... *H01M 10/613* (2015.04); *H01M 10/625* (2015.04); *H01M 10/6572* (2015.04); *H02J 7/0024* (2013.01); *Y02T 10/705* (2013.01); *Y02T 10/7005* (2013.01); *Y02T 10/7055* (2013.01); *Y10T 307/50* (2015.04); *Y10T 307/696* (2015.04)

(58) Field of Classification Search
CPC .... H01M 10/5004; B60L 3/0046; B60L 3/12; B60L 11/1874; Y10T 307/50; Y10T 307/696; Y02T 10/7005; Y02T 10/705; Y02T 10/7055
USPC .......................................................... 307/80
See application file for complete search history.

(56) References Cited

U.S. PATENT DOCUMENTS

| | | | |
|---|---|---|---|
| 2008/0311466 A1* | 12/2008 | Yang | H01M 10/486 429/62 |
| 2011/0266996 A1 | 11/2011 | Sugano | |
| 2011/0287285 A1 | 11/2011 | Yoon | |
| 2013/0270905 A1* | 10/2013 | Feuerstack | B60L 11/1866 307/18 |

FOREIGN PATENT DOCUMENTS

| | | |
|---|---|---|
| DE | 10 2010 027 857 A1 | 10/2011 |
| DE | 10 2010 027 861 A1 | 10/2011 |
| DE | 10 2010 041 014 A1 | 3/2012 |
| DE | 10 2010 041 068 A1 | 3/2012 |
| JP | 2008-41614 A | 2/2008 |
| WO | 2008/102543 A1 | 8/2008 |

* cited by examiner

US 9,793,710 B2

ENERGY STORING DEVICE WITH COOLING ELEMENTS, AND METHOD FOR COOLING ENERGY STORING CELLS

This application is a 35 U.S.C. §371 National Stage Application of PCT/EP2013/055125, filed on Mar. 13, 2013, which claims the benefit of priority to Serial No. DE 10 2012 205 109.0, filed on Mar. 29, 2012 in Germany, the disclosures of which are incorporated herein by reference in their entirety.

The disclosure relates to an energy storage device with cooling elements, in particular in a direct inverter circuit for batteries for supplying power to electrical machines, and also to a method for cooling specialized energy storage cells of an energy storage device, in particular for an emergency mode of an electrically operated vehicle.

BACKGROUND

The trend is that in the future electronic systems which combine new energy storage technologies with electrical drive technology will be used increasingly both in stationary applications, such as wind power installations or solar installations for example, and also in vehicles, such as hybrid or electric vehicles.

In order to feed alternating current into an electrical machine, a DC voltage which is provided by a DC voltage intermediate circuit is usually converted into a three-phase AC voltage by means of a converter in the form of a pulse-controlled inverter. The DC voltage intermediate circuit is fed by a line of battery modules which are connected in series. In order to be able to meet the requirements for power and energy stipulated for a respective application, often a plurality of battery modules are connected in series in a traction battery. An energy storage system of this kind is often used, for example, in electrically operated vehicles.

The series circuit comprising a plurality of battery modules is associated with the problem that the entire line fails if a single battery module fails. Such a failure of the energy supply line can result in failure of the entire system. Furthermore, temporarily or permanently occurring power reductions of an individual battery module can lead to power reductions in the entire energy supply line.

Document U.S. Pat. No. 5,642,275 A1 describes a battery system with an integrated inverter function. Systems of this kind are known under the name Multilevel Cascaded Inverter or else Battery Direct Inverter (BDI). Systems of this kind comprise DC sources in a plurality of energy storage module lines, which can be connected directly to an electrical machine or an electrical power supply system. Single-phase or polyphase supply voltages can be generated in this case. The energy storage module lines in this case have a plurality of energy storage modules which are connected in series, wherein each energy storage module has at least one battery cell and an assigned controllable coupling unit, which makes it possible to interrupt the respective energy storage module line or to bridge the respectively assigned at least one battery cell or to connect the respectively assigned at least one battery cell into the respective energy storage module line, depending on control signals. By suitable driving of the coupling units, for example with the aid of pulse width modulation, suitable phase signals for controlling the phase output voltage can also be provided, with the result that a separate pulse-controlled inverter can be dispensed with. The pulse-controlled inverter required for controlling the phase output voltage is thus integrated into the battery.

As alternatives, DE 10 2010 027 857 A1 and DE 10 2010 027 861 A1 disclose battery cells in energy storage devices, which battery cells are connected in a modular manner and can be selectively coupled to and decoupled from the line of battery cells, which are connected in series, by means of suitably driving coupling units. Systems of this kind are known under the name Battery Direct Converter (BDC). Systems of this kind comprise DC sources in an energy storage module line, which DC sources can be connected to a DC voltage intermediate circuit for supplying electrical energy to an electrical machine or to an electrical power supply system by means of a pulse-controlled inverter.

In this case, the energy storage module line has a plurality of energy storage modules which are connected in series, wherein each energy storage module has at least one battery cell and an associated controllable coupling unit which allows the in each case associated at least one battery cell to be bridged or allows the in each case associated at least one battery cell to be connected into the respective energy storage module line depending on control signals. The coupling unit can optionally be designed in such a way that it additionally allows the respectively associated at least one battery cell to also be connected into the respective energy storage module line or interrupt the respective energy storage module line with inverse polarity.

Both BDCs and BDIs usually have a higher degree of efficiency and a higher degree of fail-safety than conventional systems. The fail-safety is ensured, amongst other things, by defective battery cells, failed battery cells or battery cells which are not at full power being disconnected from the energy supply lines by suitable bridging driving of the coupling units.

When systems of this kind are used in electrically operated vehicles, the battery cells and/or other components of the respective energy storage modules may overheat and the energy storage device may be damaged. In order to avoid this, measures which keep the temperature of the energy storage device in a range which is not critical for the reliability and functioning of the energy storage device are usually initiated. Efficient, cost-effective and rapid-reaction methods for controlling the climate of modular energy storage devices are required.

SUMMARY

According to one embodiment, the present disclosure provides an energy storage device for generating a supply voltage for an electrical machine, having at least one energy supply branch which is connected in parallel and each of which has a large number of first and second energy storage modules which are connected in series. The first and second energy storage modules each comprise an energy storage cell module which has at least one energy storage cell, and a coupling device which is designed selectively to connect the energy storage cell module into the respective energy supply branch or to bridge said energy storage cell module, wherein the second energy storage modules each further have a cooling element for the at least one energy storage cell, and wherein the cooling element is designed to cool the at least one energy storage cell depending on a control signal from a cooling control device.

According to a further embodiment, the present disclosure provides a system having an energy storage device according to the disclosure, an n-phase electrical machine, where n >1, with the phase lines of said electrical machine being connected to phase connections of the energy storage device, and a cooling control device which is designed to generate control signals for driving the cooling elements depending on the temperature of the energy storage modules of the energy storage device.

According to a further embodiment, the present disclosure provides a method for operating an energy storage device according to the disclosure, comprising the steps of detecting the temperature of the energy storage cells of the energy storage device, cooling the energy storage cells of the second energy storage modules of each energy supply branch with the aid of the cooling elements when the detected temperature for the second energy storage modules exceeds a first temperature threshold value, driving the coupling devices of the second energy storage modules for generating the supply voltage by the second energy storage modules when the detected temperature for the first energy storage modules exceeds a second temperature threshold value which is greater than the first temperature threshold value, while at the same time disconnecting the first energy storage modules when the detected temperature for the first energy storage modules exceeds the second temperature threshold value.

One concept of the present disclosure is to reduce the energy requirement and time requirement for cooling energy storage cells of an energy storage device and at the same time increasing the availability of an electrical drive system which is operated using the energy storage device. To this end, special energy storage modules which are equipped with cooling elements and can be separately and effectively cooled in critical situations are selected in the energy storage device.

The cooled energy storage cells can then advantageously be used for (emergency) voltage generation by the energy storage device when there is a critical situation at elevated temperatures, for example during emergency operation of an electric vehicle which is operated using the energy storage device.

One advantage is that the energy requirement for cooling is kept low, since only the selected energy storage cells of an energy storage device have to be selectively particularly efficiently cooled. A further advantage is that direct cooling of the selected energy storage cells is made possible, it being possible for said energy storage cells to be operated with standard currents from the other energy storage modules, so that the cells to be cooled are no longer heated by additionally required power. Moreover, the structural design of the cooling elements can be made cost-effective by utilizing existing components.

According to one embodiment of the energy storage device according to the disclosure, the cooling elements comprise Peltier elements or thermoelectric generators. These can advantageously be integrated directly into the energy storage cell housing, so that particularly rapid and powerful cooling of selected energy storage modules is made possible.

According to a further embodiment of the energy storage device according to the disclosure, the cooling elements can be coupled to the energy storage cell module of the second energy storage modules and supplied with electrical energy by the energy storage cells of the second energy storage modules. Quick and simple connection of the cooling elements is ensured as a result.

According to a further embodiment of the energy storage device according to the disclosure, the cooling elements can be coupled to an energy storage cell module of at least a first energy storage module and supplied with electrical energy by the energy storage cells of the at least one first energy storage module. This advantageously allows energy to be supplied to the cooling elements by energy storage modules other than the energy storage modules to be cooled, so that the efficiency of cooling is higher.

According to one embodiment of the method according to the disclosure, the cooling elements can be supplied with electrical energy by the first energy storage modules when the detected temperature for the first energy storage modules does not exceed the second temperature threshold value. The cooling elements can also be supplied with electrical energy by the second energy storage modules when the detected temperature for the first energy storage modules exceeds the second temperature threshold value. This allows dedicated emergency modules for emergency operation of an electrical machine to be determined, it being possible for overheating to be delayed for as long as possible by an efficient cooling strategy in said emergency modules.

According to a further embodiment of the method according to the disclosure, the step of disconnecting the second energy storage modules can further take place when the detected temperature for the second energy storage modules exceeds the second temperature threshold value. This ends the emergency operation of an electrical machine and prevents the additionally cooled energy storage modules from also being damaged.

Further features and advantages of embodiments of the disclosure can be gathered from the following description with reference to the appended drawings.

DETAILED DESCRIPTION

Figure 1:
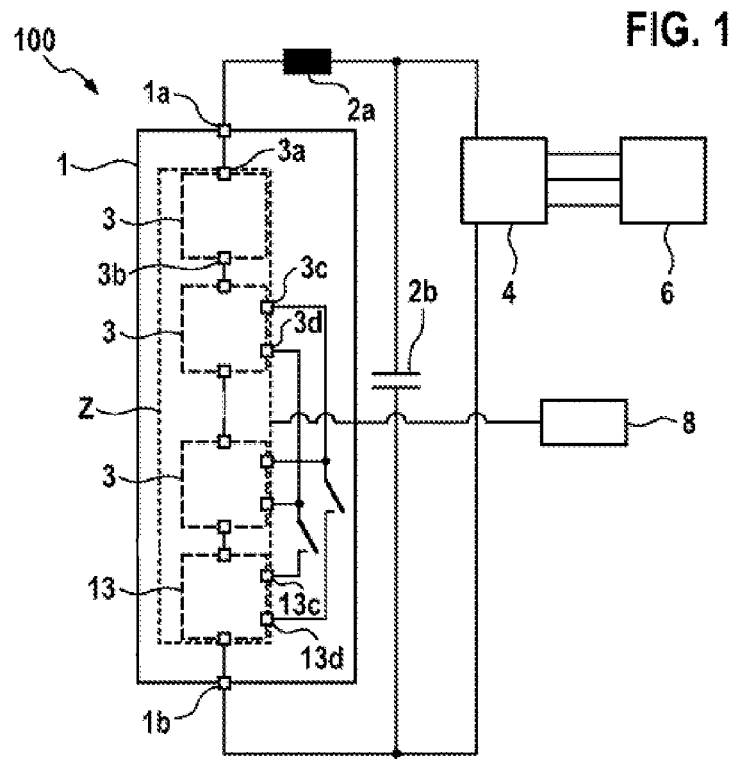
FIG. 1 is a schematic illustration of a system having an energy storage device according to one embodiment of the present disclosure.

FIG. 1 shows a system 100 for the voltage conversion of DC voltage provided by energy storage modules 3 or 13 into an n-phase AC voltage. The system 100 comprises an energy storage device 1 having energy storage modules 3 which are connected in series in an energy supply line or energy supply branch Z. The energy supply line is coupled between two output connections 1a and 1b of the energy storage device 1, said output connections each being coupled to a DC voltage intermediate circuit 2b. The system 100 in FIG. 1 serves, by way of example, to feed a three-phase electrical machine 6. However, provision may also be made for the energy storage device 1 to be used for generating electric current for an energy supply system 6.

To this end, the energy storage device 1 is coupled to the DC voltage intermediate circuit 2b by means of a coupling inductance 2a. The coupling inductance 2a can be, for example, an inductor which is connected in a targeted manner between the DC voltage intermediate circuit 2b and the output connection 1a of the energy storage device 1. As an alternative, it may also be possible for the coupling inductance 2a to be formed by parasitic inductances, which are present in any case, in the circuitry between the energy storage device 1 and the DC voltage intermediate circuit 2b.

The DC voltage intermediate circuit 2b feeds a pulse-controlled inverter 4 which provides a three-phase AC voltage for the electrical machine 6 from the DC voltage of the DC voltage intermediate circuit 2b.

Furthermore, the system 100 may comprise a control device 8 which is connected to the energy storage device 1 and which can be used to control the energy storage device 1 in order to provide the desired total output voltage of the energy storage device 1 at the respective output connections 1a, 1b. In addition, the control device 8 can be designed to drive the respective coupling elements or active switching elements of the energy storage device 1 when the energy storage cells of the energy storage device 1 are charged.

The energy supply line of the energy storage device 1 has at least two energy storage modules 3 and 13 which are connected in series. The number of energy storage modules 3 and 13 in FIG. 1 is, by way of example, four, with, however, any other number of energy storage modules 3 and 13 likewise being possible. In this case, the energy storage modules 3 and 13 comprise a first group of energy storage modules 3 and a second group of energy storage modules 13. The number of energy storage modules per group can be freely selected in this case. Since the energy storage modules 3 and 13 are primarily connected in series, the module output voltages from the first and second energy storage modules 3 and, respectively, 13 add up to the total output voltage which is provided at the output connections 1a, 1b of the energy storage device 1.

The first energy storage modules 3 each have two output connections 3a and 3b by means of which a module output voltage from the first energy storage modules 3 can be provided. Two exemplary designs of the first energy storage modules 3 are shown in greater detail in FIG. 2 and FIG. 3. In this case, the first energy storage modules 3 each comprise a coupling device 7 with a plurality of coupling elements 7a, 7c and also 7b and 7d. The first energy storage modules 3 furthermore each comprise an energy storage cell module 5 having one or more energy storage cells 5a to 5k which are connected in series.

Figure 2:
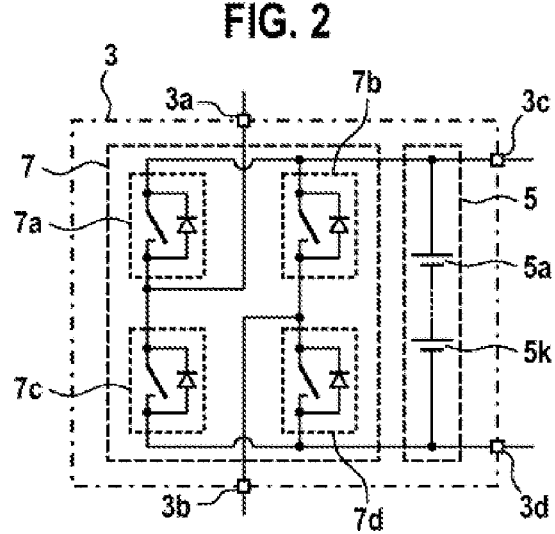
FIG. 2 is a schematic illustration of an exemplary embodiment of a first energy storage module of an energy storage device according to a further embodiment of the present disclosure.
Figure 3:
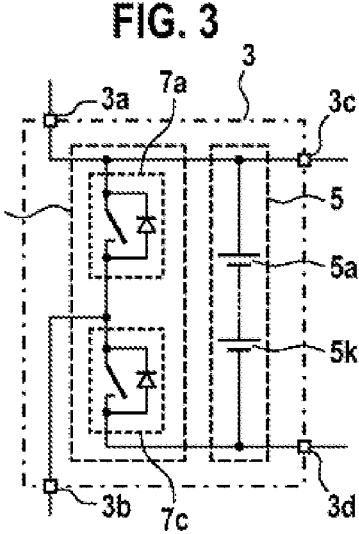
FIG. 3 is a schematic illustration of a further exemplary embodiment of a first energy storage module of an energy storage device according to a further embodiment of the present disclosure.

In this case, the energy storage cell module 5 can have, for example, cells 5a to 5k, for example lithium-ion cells or rechargeable lithium-ion batteries, which are connected in series. In this case, the number of energy storage cells 5a to 5k in the first energy storage modules 3 which are shown in FIG. 2 and FIG. 3 is, by way of example, two, with, however, any other number of energy storage cells 5a to 5k likewise being possible. The energy storage cell modules 5 have a terminal voltage of $U_M$ and are connected to input connections of the associated coupling device 7 via connecting lines. Therefore, the voltage $U_M$ is applied to the input terminals of the associated coupling device 7.

In FIG. 2, the coupling elements 7a and 7c, which are connected in series and of which the center tap is connected to the output terminal 3a, form the so-called left-hand branch of the full bridge, and the coupling elements 7b and 7d, which are connected in series and of which the center tap is connected to the output terminal 3b, forms the so-called right-hand branch of the full bridge. In FIG. 2, the coupling device 7 is designed as a full-bridge circuit with in each case two coupling elements 7a, 7c and two coupling elements 7b, 7d. In this case, the coupling elements 7a, 7b, 7c, 7d can each have an active switching element, for example a semiconductor switch, and a free-wheeling diode which is connected in parallel with said active switching element. Provision may be made here for the coupling elements 7a, 7b, 7c, 7d to be in the form of MOSFET switches which already have an intrinsic diode.

The coupling elements 7a, 7b, 7c, 7d can be driven in such a way, for example with the aid of the control device 8 illustrated in FIG. 1, that the respective energy storage cell module 5 is switched selectively between the output connections 3a and 3b, or that the energy storage cell module 5 is bridged. With reference to FIG. 2, the energy storage cell module 5 can be switched, for example, in the forward direction between the output connections 3a and 3b by the active switching element of the coupling element 7d and the active switching element of the coupling element 7a being moved to a closed state, while the two other active switching elements of the coupling elements 7b and 7c are moved to an open state. In this case, the voltage $U_M$ is applied between the output terminals 3a and 3b of the coupling device 7. A bridging state can be created, for example, by the two active switching elements of the coupling elements 7a and 7b being moved to the closed state, while the two active switching elements of the coupling elements 7c and 7d are kept in the open state. A second bridging state can be created, for example, by the two active switches of the coupling elements 7c and 7d being moved to the closed state, while the active switching elements of the coupling elements 7a and 7b are kept in the open state. In both bridging states, the voltage 0 is applied between the two output terminals 3a and 3b of the coupling device 7. The energy storage cell module 5 can likewise be connected in the backward direction between the output connections 3a and 3b of the coupling device 7 by the active switching elements of the coupling elements 7b and 7c being moved to the closed state, while the active switching elements of the coupling elements 7a and 7d are moved to the open state. In this case, the voltage $-U_M$ is applied between the two output terminals 3a and 3b of the coupling device 7.

The first energy storage modules 3 additionally have supply connections 3c and 3d which are coupled to the energy storage cell module 5 and at which a supply voltage for the first energy storage modules 3 can additionally be tapped off, as explained in greater detail further below.

FIG. 3 is a schematic illustration of a further exemplary configuration for a first energy storage module 3. In this case, the coupling device 7 comprises only the coupling elements 7a and 7c which, as a half-bridge circuit, can be switched the energy storage cell module 5 either into a bridging state or a switching state in the forward direction into the energy supply line Z. Otherwise, similar drive rules to those explained in connection with FIG. 3 for the energy storage module 3 in a full-bridge circuit shown there apply.

Figure 4:
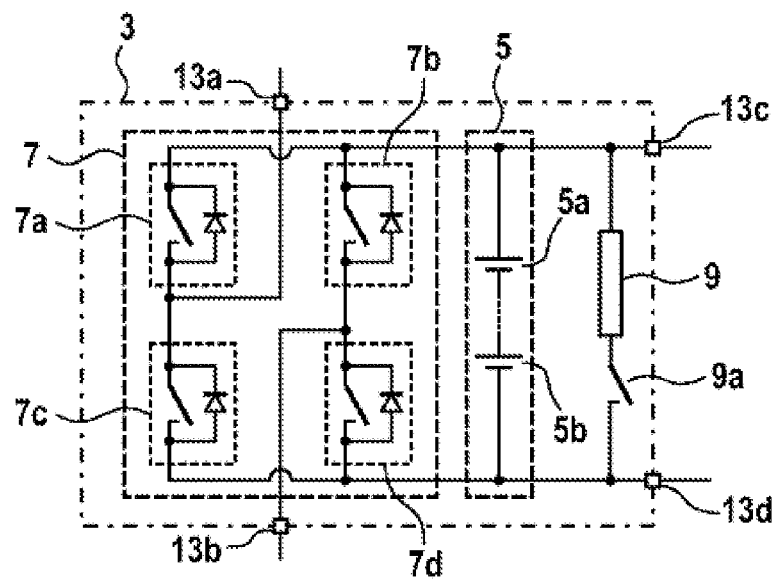
FIG. 4 is a schematic illustration of an exemplary embodiment of a second energy storage module of an energy storage device according to a further embodiment of the present disclosure.
Figure 5:
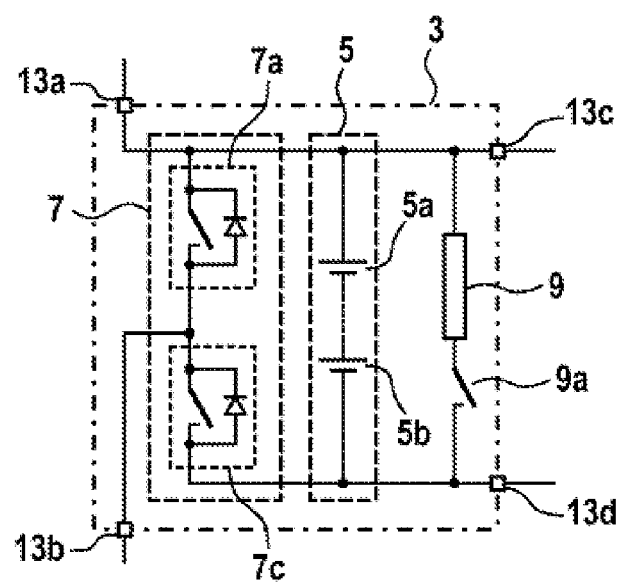
FIG. 5 is a schematic illustration of a further exemplary embodiment of a second energy storage module of an energy storage device according to a further embodiment of the present disclosure.

FIGS. 4 and 5 are schematic illustrations of two exemplary designs of the second energy storage modules 13 in greater detail. The second energy storage modules 13 have substantially the same design as the first energy storage modules 3 and differ from the first energy storage modules 3 only in that a cooling element 9 which can be fed with electrical energy by the energy storage cell module 5 is coupled between the supply connections 13*c* and 13*d*. A switching device 9*a* with which the cooling element 9 can be disconnected from the voltage supply is provided for selectively activating and deactivating the cooling element 9.

Individual energy storage cell modules 5 of the first and second energy storage modules 3 and 13 can be integrated into the series circuit of the energy supply line Z in a targeted manner by suitable driving of the coupling devices 7. As a result, a total output voltage, which is dependent on the individual output voltages from the energy storage cell modules 5 of the energy storage modules 3 and, respectively, 13, can be provided by driving the coupling devices 7 in a targeted manner in order to selectively switch the energy storage cell modules 5 of the energy storage modules 3 and, respectively, 13 into the energy supply line Z. In this case, the total output voltage can be adjusted in steps in each case, wherein the number of steps is scaled with the number of energy storage modules 3 and, respectively, 13. In the case of a number of n first and second energy storage modules 3 and 13, the total output voltage of the energy supply line Z can be adjusted in 2n+1 steps between $-n \cdot U_M$, . . . , 0, . . . , $+n \cdot U_M$.

Figure 6:
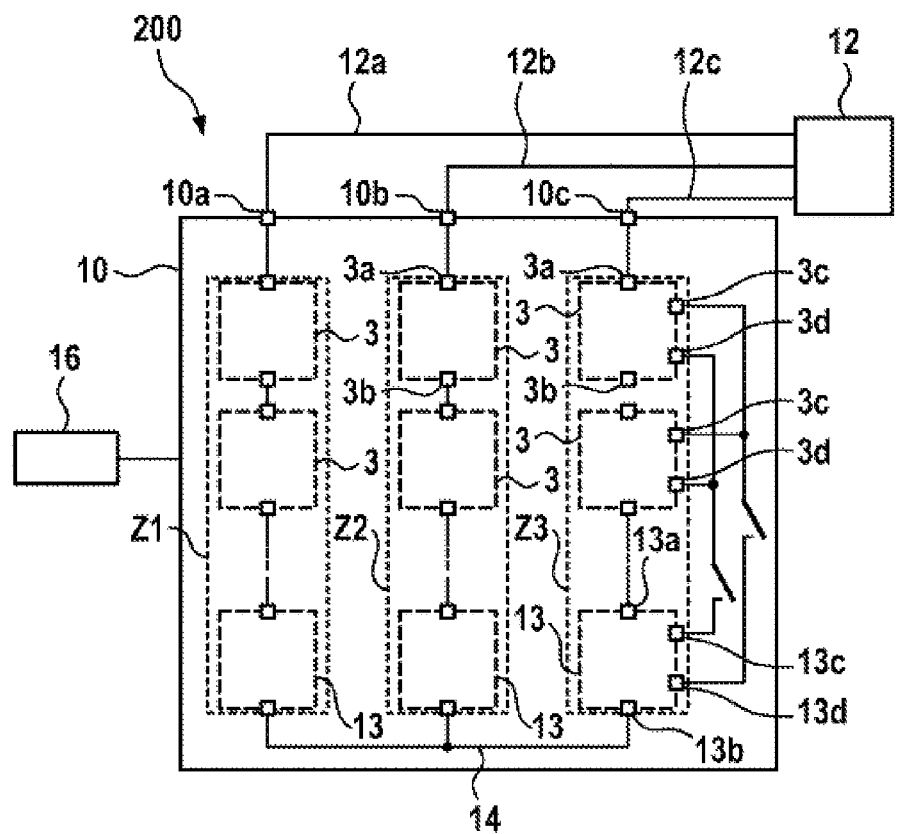
FIG. 6 is a schematic illustration of a further system having an energy storage device according to a further embodiment of the present disclosure.

FIG. 6 shows a further system 200 for voltage conversion from DC voltage, which is provided by energy storage modules 3, into an n-phase AC voltage. The system 200 comprises an energy storage device 10 having energy storage modules 3 and 13 which are connected in series in energy supply branches Z1, Z2, Z3. By way of example, FIG. 6 shows three energy supply branches Z1, Z2, Z3 which are suitable for generating a three-phase AC voltage, for example for a three-phase machine. However, it is clear that any other number of energy supply branches may likewise be possible. The energy storage device 10 has, on each energy supply branch, an output connection 10*a*, 10*b*, 10*c*, which output connections are each connected to phase lines 12*a*, 12*b* and, respectively, 12*c* which couple the energy storage device 10 to an electrical machine 12. The system 200 in FIG. 6 serves, by way of example, to feed a three-phase electrical machine 12. However, provision can also be made for the energy storage device 10 to be used to generate electric current for an energy supply system 12.

The system 200 can furthermore comprise a control device 16 which is connected to the energy storage device 10 and with the aid of which the energy storage device 10 can be controlled in order to provide the desired output voltages at the respective output connections 10*a*, 10*b*, 10*c*. The energy supply branches Z1, Z2 and Z3 can be connected at their ends to a reference potential 14 (reference rail). This can carry an average potential with respect to the phase lines 12*a*, 12*b*, 12*c* of the electrical machine 12 and can be connected to ground potential, for example.

Similarly to that shown in FIG. 1, each of the energy supply branches Z1, Z2 and Z3 has at least two energy storage modules 3 and, respectively, 13 which are connected in series, wherein a first group of energy storage modules 3 and a second group of energy storage modules 13 are provided. Exemplary embodiments of the first and, respectively, second energy storage modules 3 and, respectively, 13 have already been explained in FIGS. 2 to 5. By way of example, the number of energy storage modules 3 and 13 per energy supply branch in FIG. 1 is three, with, however, any other number of energy storage modules likewise being possible. In this case, each of the energy supply branches Z1, Z2 and Z3 preferably comprises the same number of energy storage modules 3, it also being possible, however, to provide a different number of energy storage modules 3 for each energy supply branch Z1, Z2 and Z3.

In the systems 100 and 200, the second energy storage modules 13 can each serve as emergency modules for emergency operation of the electrical machine 6 or 12, in particular for emergency operation of an electrical drive system of an electrically operated vehicle. To this end, the second energy storage modules 13 can be driven by being equipped with cooling elements 9 using a separate cooling strategy. In the event of the energy storage device 1 or 10 overheating or in the event of a threat of said energy storage device overheating, the second energy storage modules 13 can be kept at a lower temperature than the first energy storage modules 3, so that complete disconnection of the system 100 or 200 for safety reasons can be either entirely avoided or at least delayed.

The cooling elements 9 can be, for example, Peltier elements or thermoelectric generators. The cooling elements 9 can be arranged, for example, directly in or on the cell windings of the energy storage cells 5*a* to 5*k* in order to directly and immediately cool the energy storage cells 5*a* to 5*k*. In this case, provision can also be made for the cooling elements 9 to be integrated into the housing of the energy storage modules 13 in order to dissipate heat from the housing.

The cooling elements 9 or the operation of the cooling elements 9 can be controlled, for example, by the control devices 8 and 16 which, as a result, function as cooling control device 8 and, respectively, 16. In particular, the cooling control devices 8 and, respectively, 16 can detect the temperature in or at the energy storage modules 3 and, respectively, 13, for example using temperature sensors (not explicitly shown in FIGS. 1 and 6). The cooling control devices 8 and, respectively, 16 are designed to drive the cooling elements 9 or the switching devices 9*a* depending on the detected temperature.

In order to supply power to the cooling elements 9, provision can be made to supply electrical energy to the cooling elements 9 by the energy storage cell module 5 of the second energy storage module 13 which is associated with the respective cooling element 9. As an alternative or in addition, provision can also be made to supply electrical energy to the cooling elements 9 by first energy storage modules 3. To this end, the supply connections 3*c*, 3*d* of a freely selectable number of first energy storage modules 3 can be connected to the supply connections 13*c*, 13*d* of the second energy storage modules 13 in a switchable manner. In particular, the energy storage cell modules 5 of the first energy storage modules 3 can take over the task of supplying power to the cooling elements 9 of the second energy storage modules 13 in this way.

In this case, it is possible to employ the respective groups of second energy storage modules 13 when the electrical machine 6 or 12 which is connected to the energy storage device 1 or, respectively, 10 is in a specific operating mode, for example in an emergency mode. In this case, provision may be made to employ only the energy storage cell modules 5 of the groups of second energy storage modules 13 in order to generate the total output voltage of the energy storage device 1 or 10.

Figure 7:
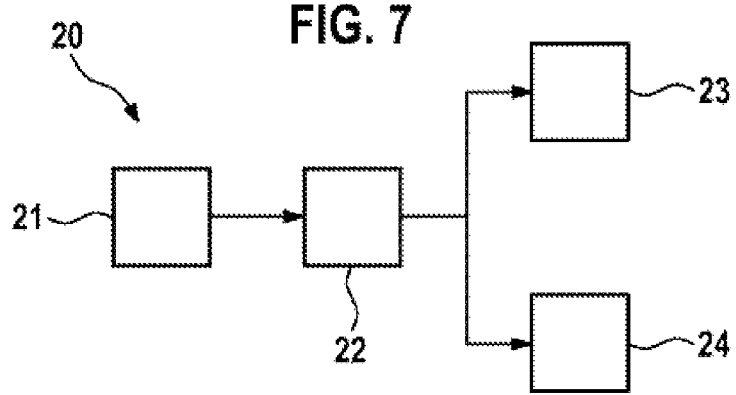
FIG. 7 is a schematic illustration of a method for operating an energy storage device according to a further embodiment of the present disclosure.

FIG. 7 shows a schematic illustration of an exemplary method 20 for operating an energy storage device, in particular an energy storage device 1 or 10, as explained in FIGS. 1 to 6. The method 20 can be used to provide a total output voltage of the energy storage device 1 or for supplying power to an electrical machine 6 or 12. The temperature of the energy storage cells 5*a*, 5*k* of the energy storage device 1 or 10 is detected in a first step 21. A separate temperature detection operation can be performed for each of the energy storage modules 3 and, respectively, 13. If the detected temperature for the second energy storage modules 13 exceeds a first temperature threshold value, the energy storage cells 5*a*, 5*k* of the second energy storage modules 13 can be cooled with the aid of the cooling elements 9 in a second step 22. As a result, cooling of the second energy storage modules 13 can begin as early as when the temperature is still moving in a non-critical range. As a result, the second energy storage modules 13 can be held at a lower temperature than the first energy storage modules 3, that is to say overheating of said second energy storage modules can be delayed for longer.

Electrical energy can be supplied to the cooling elements 9 by the first energy storage modules 3 as long as the detected temperature for the first energy storage modules 3 does not exceed a second temperature threshold value. In this case, the second temperature threshold value can be a critical threshold value above which components of the energy storage modules 3 may be damaged. In a third step 23, the coupling devices 7 of the second energy storage modules 13 can be driven in order to generate the supply voltage by the second energy storage modules 13 when the detected temperature for the first energy storage modules 3 has exceeded the second temperature threshold value. At the same time, a step 24 of disconnecting the first energy storage modules 3 can then take place. In this state, the second energy storage modules 13 take over the task of generating the total output voltage of the energy storage device 1 or 10. This state may be, for example, an emergency operating mode which can be initiated, for example, in connection with "limp home" functions of an electrical drive system of an electrically operated vehicle.

Once the first energy storage modules 3 are disconnected, electrical energy can be supplied to the cooling elements 9 by the second energy storage modules 13. Owing to the initial supply of energy to the cooling elements 9 from the first energy storage modules 3, additional heating of the second energy storage modules 13 by the additional loading of the energy storage cells 5*a* to 5*k* for supplying the cooling elements 9 can be avoided. The cooling elements 9 are supplied by the respectively associated second energy storage modules 13 only when the first energy storage modules 3 are no longer active. If the detected temperature exceeds the second temperature threshold value for the second energy storage modules 13 too, said second energy storage modules can be disconnected, so that the energy storage device 1 or 10 is temporarily no longer operable. However, this time can be considerably delayed by additional cooling with the aid of the cooling elements 9, so that the availability of the energy storage device 1 or 10 and therefore of the entire system 100 or 200 is considerably increased.

The invention claimed is:

1. An energy storage device for generating a supply voltage for an electrical machine, comprising:
    at least one energy supply branch connected in parallel with the electrical machine, each energy supply branch having one or more first energy storage modules and one or more second energy storage modules connected in series,
    wherein the first energy storage modules and the second energy storage modules each include:
        an energy storage cell module having at least one energy storage cell, and
        at least one pair of coupling devices configured to selectively connect the energy storage cell module into a respective energy supply branch and to selectively bridge the energy storage cell module, each pair of coupling devices including two coupling devices electrically and mechanically connected in series, each pair of coupling devices electrically and mechanically connected in parallel with the energy storage cell, and when there are more than one pair of coupling devices, each pair of coupling devices electrically and mechanically connected in parallel with the energy storage cell,
    wherein the second energy storage modules each further comprise a cooling element for the at least one energy storage cell, and
    wherein the cooling element is configured to cool the at least one energy storage cell based upon a control signal from a cooling control device.

2. The energy storage device according to claim 1, wherein the cooling elements each comprise one of Peltier elements and thermoelectric generators.

3. The energy storage device according to claim 1, wherein the cooling elements are each coupled to the energy storage cell module of respective second energy storage modules and are supplied with electrical energy by the energy storage cells of the second energy storage modules.

4. The energy storage device according to claim 1, wherein the cooling elements are coupled to an energy storage cell module of at least one of the first energy storage modules and are supplied with electrical energy by the energy storage cells of the at least one first energy storage module.

5. A system, comprising:
    an energy storage device including:
        an n-phase electrical machine, where n≥1, having phase lines connected to phase connections of the energy storage device;
        at least one energy supply branch connected in parallel with the n-phase electrical machine, each energy supply branch having one or more first energy storage modules and one or more second energy storage modules connected in series; and
        a cooling control device configured to generate control signals that drive cooling elements depending on a temperature of the first energy storage modules and the second energy storage modules of the energy storage device,
    wherein the first energy storage modules and second energy storage modules each include:
        an energy storage cell module having at least one energy storage cell, and
        at least one pair of coupling devices configured to selectively connect the energy storage cell module into a respective energy supply branch and to selectively bridge the energy storage cell module, each pair of coupling devices including two coupling devices electrically and mechanically connected in series, each pair of coupling devices electrically and mechanically connected in parallel with the energy storage cell, and when there are more than one pair of coupling devices, each pair of coupling devices electrically and mechanically connected in parallel with the energy storage cell,
    wherein the second energy storage modules each further comprise a cooling element for the at least one energy storage cell, and wherein the cooling element is configured to cool the at least one energy storage cell based upon a control signal from the cooling control device.

6. A method for operating an energy storage device having at least one energy supply branch connected in parallel with an electrical machine, each energy supply branch having one or more first energy storage modules and one or more second energy storage modules connected in series, wherein the first energy storage modules and second energy storage modules each have (i) an energy storage cell module having at least one energy storage cell, and (ii) a coupling device configured to selectively connect the energy storage cell module into a respective energy supply branch and to selectively bridge the energy storage cell module, wherein the second energy storage modules each further have a cooling element for the at least one energy storage cell, and wherein the cooling element is configured to cool the at least one energy storage cell based upon a control signal from a cooling control device, comprising:

detecting temperatures of the energy storage cells of the energy storage device;

cooling the energy storage cells of the second energy storage modules of each energy supply branch with the cooling elements when a detected temperature for the second energy storage modules exceeds a first temperature threshold value;

driving the coupling device of the second energy storage modules to generate a supply voltage with the second energy storage modules when a detected temperature for the first energy storage modules exceeds a second temperature threshold value which is greater than the first temperature threshold value; and disconnecting, at the same time as the driving, the first energy storage modules when the detected temperature for the first energy storage modules exceeds the second temperature threshold value.

7. The method according to claim 6, further comprising:

supplying the cooling elements with electrical energy from the first energy storage modules when the detected temperature for the first energy storage modules does not exceed the second temperature threshold value; and supplying the cooling elements with electrical energy from the second energy storage modules when the detected temperature for the first energy storage modules exceeds the second temperature threshold value.

8. The method according to claim 7, further comprising:

disconnecting the second energy storage modules when the detected temperature for the second energy storage modules exceeds the second temperature threshold value.

* * * * *

UNITED STATES PATENT AND TRADEMARK OFFICE
CERTIFICATE OF CORRECTION

PATENT NO. : 9,793,710 B2
APPLICATION NO. : 14/387943
DATED : October 17, 2017
INVENTOR(S) : Reihlen et al.

It is certified that error appears in the above-identified patent and that said Letters Patent is hereby corrected as shown below:

On the Title Page

Item (56) should read:
OTHER PUBLICATIONS
International Search Report corresponding to PCT Application No. PCT/EP2013/055125, mailed Feb. 5, 2014 (German and English language document) (7 pages).

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*